United States Patent Office 3,772,266
Patented Nov. 13, 1973

3,772,266
PROCESS FOR THE PREPARATION OF PROPYLENE GLYCOL ALGINATE FROM PARTIALLY NEUTRALIZED ALGINIC ACID
David J. Pettitt and Vincent H. Noto, San Diego, Calif., assignors to Kelco Company, San Diego, Calif.
No Drawing. Continuation-in-part of application Ser. No. 261,125, June 8, 1972, which is a continuation of application Ser. No. 97,383, Dec. 11, 1970, both now abandoned. This application Oct. 19, 1972, Ser. No. 299,033
Int. Cl. C08b 19/10
U.S. Cl. 260—209.6      10 Claims

ABSTRACT OF THE DISCLOSURE

Algenic acid which has been neutralized to the extent of about 6–50 mole percent, preferably about 8–22 mole percent, and has a solids content of from about 65 to about 78 weight percent, is reacted with gaseous propylene oxide at a pressure of at least about 0.8 atmosphere, preferably 0.8–1.5 atmospheres, and at a temperature of from about 60° C. to about 100° C. for a time such that the propylene glycol alginate has a significant solubility in distilled water, preferably has a pH, 2 weight percent solution in distilled water from about 3.4 to about 4.9. The propylene oxide affords essentially the gaseous atmosphere in the reaction vessel, that is, no significant amount of inert gas, such as air, is present therein.

CROSS-REFERENCE TO RELATED APPLICATIONS

This application is a continuation-in-part of our copending application Ser. No. 261,125, filed June 8, 1972, now abandoned, which in turn is a continuation of our then copending application Ser. No. 97,383 filed Dec. 11, 1970, now abandoned.

BACKGROUND OF THE INVENTION

(1) Field of the invention

This invention relates to an improved process for preparation of propylene glycol esters of alginic acid.

(2) Background of the prior art

Propylene glycol alginates are commercial materials having a variety of uses. For example, they may be employed as additives to beer to produce a more stable, longer-lived, creamier foam. Additionally, propylene glycol alginates are used in the manufacture of French dressings because of their unique combination of emulsifying and thickening properties. They are used in a variety of manufacturing processes to stabilize emulsions and suspend particles in liquids such as fruit pulp drinks.

Inasmuch as propylene glycol alginates are commercial products which are used on a large scale, it is desirable that their process of preparation be made as efficient as possible in order to reduce their manufacturing costs. Previous processes, e.g., U.S. Pat. Nos. 2,426,125 and 2,494,911, for preparation of these materials have required reaction times in the order of 4 to 22 hours with the usual time being 10 to 12 hours. In accord with our invention, we have developed a process in which the reaction time is considerably reduced with a consequent savings in manufacturing costs.

SUMMARY OF THE INVENTION

The process of this invention for the preparation of propylene glycol alginates is directed to the reaction of an alginic acid which is (a) neutralized to the extent of from about 6 mole percent to about 50 mole percent, preferably about 8 mole percent to about 22 mole percent of the carboxyl groups of said alginic acid are neutralized, and (b) has a solids content of from about 65 to about 78 weight percent; and gaseous propylene oxide, said propylene oxide affording essentially the gaseous atmosphere in the reaction zone, at a temperature of reaction from about 60° C. to about 100° C., at a pressure of at least about 0.8 atmosphere, preferably about 0.8–1.5 atmospheres, for a time such that the propylene glycol alginate produced has a significant solubility in distilled water, desirably said solubility is at least about 0.1 weight percent and preferably is at least about 0.5 weight percent.

In one embodiment of the invention, the reaction vessel is vacuum processed to remove inert gas prior to contact of said alginic acid and said propylene oxide. In another embodiment of the invention propylene oxide is swept through said alginic acid in the reaction vessel prior to said reaction.

Preferably the alginic acid is neutralized partially by an ion from the class consisting of alkali metals, alkaline earth metals, ammonium, lower alkylamines and mixtures thereof.

The propylene glycol alginate produced has a pH, 2 weight percent of said alginate in distilled water, of from about 3.4 to about 4.9, preferably about 3.8–4.6.

Preferably the reaction condition and alginic acid are coordinated to afford a reaction time under about 3 hours, e.g., about 2 hours.

DESCRIPTION OF THE INVENTION, EMBODIMENT AND EXAMPLES

Partialy neutralized alginic acid

In the practice of our process, partially neutralized alginic acid is employed as a reactant. This reactant material may be prepared by partially neutralizing alginic acid by reaction with a base or basic salt or other material which when combined with the alginic acid will form a salt of the alginic acid, desirably a water soluble product salt. Typical of such reactants are ammonium hydroxide, the lower alkyl amines, alkali and alkaline earth metals, hydroxides and carbonates and basic salts. Examples of such bases and basic salts are sodium hydroxide, sodium bicarbonate, sodium carbonate, sodium phosphate, ammonium hydroxide, ammonium carbonate, ammonia and magnesium carbonate. The alginic acid employed in our process is partially neutralized to the extent that about 6 to 50 mole percent, and preferably 8 to 22 mole percent of the carboxyl groups in the alginic acid are neutralized.

The alginic acid may be partially neutralized by reaction with an alkali metal carbonate or ammonium carbonate, by first passing the acid through a hammer mill several times without drying. A small amount of a wetting agent may then be added followed by addition of a milky slurry of a dilute aqueous solution of the carbonate reactant dispersed in a low boiling alcohol or ketone. After several minutes of stiring, the mixture may then be withdrawn from the reaction vessel and the partially neutralized acid may be dried.

In still another procedure, the alginic acid may be neutralized with an alkali metal phosphate such as trisodium phosphate by adding the undried acid, e.g., containing about 80% by weight of water, to an alcohol, such as isopropanol. The mixture may be stirred for several minutes followed by addition of a suspension of the finely ground phosphate reactant and a further quantity of alcohol. The mixture may then be stirred for an additional time followed by draining of the liquid and pressing of the mass to expel liquid. Following this, the partially neutralized alginic acid may be dried and fluffed.

In the production of alginic acid, as generally described in U. S. Pat. 1,814,981, raw kelp or a similar marine plant is leached with a material such as a solution of sodium carbonate. This results in the production of sodium alginate solution; calcium alginate is precipitated by reaction with a calcium compound, such as calcium chloride. The insoluble fibrous calcium alginate may be converted to alginic acid by reaction with an acid, such as hydrochloric acid.

Alginic acid, when produced in the above described manner, will generally contain calcium neutralized carboxyl groups. The quantity of calcium which is present is dependent on the quantity of acid used to convert the calcium alginate to alginic acid, i.e., the greater the quantity of acid used in the conversion reaction, the less calcium in the product alginic acid. The calcium-containing alginic acid does not lose that calcium upon further neutralization by another ion.

The alginic acid employed as a reactant in our process may be partially neutralized solely by calcium or by another ion, or a combination of calcium and an other ion(s). It has been found that the partially neutralized alginic acid charged to our process must have at least about six (6) mole percent of the carboxyl groups reacted by defined ion(s). Calcium-containing alginic acid having a calcium content less than about six (6) mole percent can be further neutralized to increase the degree of neutralization. The partially neutralized alginic acid charge to our process has about 6 to about 50 mole percent, preferably about 8 to 22 mole percent of the carboxyl groups reacted with defined ion(s).

The partial neutralization of alginic acid is not new. The various techniques for partial neutralization are disclosed in connection with the production of the specific partially neutralized alginic acid which is charged to the process of our invention.

Solids content of partially neutralized alginic acid

Following the partial neutralization of the alginic acid, the solids content of the partially neutralized acid is adjusted to about 65 to 78% by weight, i.e., a liquid content on the order of about 22 to 35 percent by weight. The liquid present in the partially neutralized acid is normally water but may be an admixture with a water miscible solvent, such as a lower alcohol, e.g., isopropyl alcohol, e.g., isopropyl alcohol.

The moisture content of the partially neutralized alginic acid may be reduced by gentle drying or by extraction with an alcohol or ketone.

In the practice of our process, we have found that the above defined solids content of the partially neutralized alginic acid reactant is critical. Under the operating conditions of our process, excessive quantities of propylene glycol by product are formed in the reaction if the solids content of the partially neutralized alginic acid reactant is less than about 65% by weight.

The reaction time is increased considerably when the solids content of the partially neutralized alginic acid reactant is more than about 78% by weight.

Propylene oxide and inert gas removal

It has been discovered that substantial dilution of reactant propylene oxide by inert gas, such as air, must be avoided. Propylene oxide dilution usually occurs within the reaction vessel itself.

Two preferred procedures for the exclusion of air dilution are given: In one procedure, the alginic acid charge is placed into a vessel that is equipped with a means of fiber agitation, such as a stirring paddle; or the walls of the reactor may rotate tumbling the fibers. Other suitable means of agitation may be used. The reactor must be capable of being sealed off from the outside atmosphere to permit the evacuation from the vessel of essentially all the inert gaseous atmosphere present. After evacuation, propylene oxide gas is permitted to enter the reactor and at least about 0.8 atmosphere pressure of propylene oxide is maintained. Greater pressures produce faster reactions. The upper limit of pressure is a function of the ability to remove heat from the fibrous mass; this heat is afforded by the exothermic nature of the esterification reaction. This method of evacuation and then filling with gaseous propylene oxide hereafter will be referred to as the vacuum initiated reaction.

The other procedure of providing a gaseous propylene oxide atmosphere places the partially neutralized alginic acid into a vessel which is sealed to the atmosphere. Then, while the vessel is agitated as previously described, gaseous propylene oxide is swept through the reactor purging the vessel and alginic acid charge previously present. This purge method of reaction will be hereafter referred to as the sweep initiated reaction.

Other process conditions and embodiments

A typical vacuum initiated reaction proceeds as follows: The alginic acid partially neutralized from 6 to 50 mole percent, as previously described, and 65 to 78 wt. percent solids is placed into a reactor with mechanical agitation. The reactor is then sealed from the atmosphere, agitation begun, and the reactor evacuated to at least 100 torr or less. Evacuation is stopped, essentially pure propylene oxide gas is introduced at preferably about 0.8–1.5 atmosphere and the fiber mass is heated to a temperature from about 60° C. to about 100° C. in the presence of the propylene oxide atmosphere. The upper limit of 100° C. may be higher if local heat build up which could char the product is avoided. The esterification reaction proceeds at a rate determined by temperature, weight percent solids, mole percent partial neutralization, and pressure of propylene oxide gas atmosphere.

The reaction is continued until the product propylene glycol alginate has significant solubility in distilled water, desirably at least about 0.1 weight percent, and preferably at least about 0.5 weight percent.

As the reaction proceeds the esterification of the partially neutralized alginic acid with propylene oxide "destroys" the carboxylic acid groups which were originally present in the acid. The acidity of the reaction system is, therefore, an accurate measure of the degree of completion of the reaction. The acidity of the reaction mixture can be monitored in any convenient manner, such as by taking samples from the reactor and determining the pH of the samples with a pH meter.

Preferably, the reaction is terminated when the pH of the propylene glycol alginate is about 3.4 to 4.9, preferably about 3.8–4.6, at a solution concentration of about 2 percent by weight in distilled water. This is the pH range which demonstrated the ability to stabilize the product with respect to clarity and viscosity at room temperature storage for several months. To determine the pH of the propylene glycol alginate at any point during the overall reaction, a sample may be taken from the reactor through a sample port—preferably an air lock port to maintain the propylene oxide pressure within the reactor while the sample is being removed. The sample is then immediately admixed with distilled water in an amount to give a solution concentration of about 2 percent by weight. The sample contains propylene glycol alginate and also water and some propylene glycol formed in the reaction. The water and propylene glycol content may be estimated in determining the amount of sample required to give a concentration of 2 percent by weight of product. Immediately after admixing the sample with distilled water, the mixture is stirred at high shear, e.g., in a Waring Blender, until the sample is in solution which may take about 5 minutes. The pH of the solution is then measured with a pH meter.

A typical sweep initiated reaction proceeds as follows: Into a reactor which is capable of being sealed from the atmosphere is placed alginic acid which has been neutralized from about 6 to 50 mole percent as previously described. Agitation is begun and through an inlet at one end of the reactor essentially pure propylene oxide gas is passed through the reactor to an outlet, preferably at the opposite end. This sweeps away the previous atmosphere and replaces it with essentially only propylene oxide gas. The reactor contents are heated from about 60° C. to 100° C. (At 100° C. the water content of the fibers leaves so rapidly on the sweep that the fibers dry and the reaction slows down considerably, see Example XVIII.) The pressure of the propylene oxide gas atmosphere is preferably about 0.8–1.5 atmosphere. From this point on, the reaction proceeds as has been described for the vacuum initiated reaction.

The reaction can be terminated by evacuation or the sweeping away of propylene oxide by air or other inert gases such as nitrogen, carbon dioxide, etc. The sweep initiated reaction is particularly suitable for a continuous process.

The propylene glycol alginate product is removed from the reaction vessel and dried by gentle heating in air or inert gas or by vacuum drying. If desired, the product may be washed with a selective solvent such as an alcohol or acetone to remove any propylene glycol formed in the reaction.

The time required for our process, upon coordination of the conditions specified above is about 3 hours or less and in some embodiments is less than 2 hours. (This short reaction time represents a considerable improvement over previous methods for preparation of propylene glycol alginates which need reaction times ranging from 4, usually over 10, to as high as 22 hours.)

Illustrative embodiments of our invention are presented in the following examples:

EXAMPLE I (Vacuum)

Into a resin pot fitted with a Teflon stirrer, a thermometer, a gas inlet and water bath for heating, was placed 76.4 gms. of 70 weight percent solids alginic acid. The acid had contained "residual" calcium ion and had been reacted with ammonium hydroxide to afford a partially neutralized acid containing a total of 19 mole percent of calcium ions and ammonium ions. Propylene oxide was placed into a boiler connected to the resin pot via a gas inlet. The alginic acid charge was heated to 40° C. and the propylene oxide was heated to its boiling point. At this point, vacuum was applied to the resin pot and then stopped after which the gas inlet was opened to the propylene oxide vapor which filled the resin pot and started the esterification of the alginic acid with a resultant exotherm that was controlled with the water bath and stirring. The reacion was run as follows:

| | |
|---|---|
| Time, hours | 1.25 |
| Temperature, ° C. | 60 |
| Pressure, atmosphere | 1 |
| Propylene oxide consumed, gms. | 27.8 |
| pH reached (2% by weight of propylene glycol alginate in distilled water) | 3.42 |

The reaction was stopped by evacuating the resin pot after 1.25 hours. It was restarted using vacuum initiation as before and continued another 0.5 hour (for a total time of 1.75 hours) at an average temperature of 59° C. and a pressure of 1.1 atmospheres consuming a total of 33 gms. of propylene oxide and reaching a product pH of 3.84.

The reaction was again stopped and again restarted by vacuum initiation and run until it had logged the following:

| | |
|---|---|
| Time (total), hours | 2.25 |
| Temperature, ° C. average | 61 |
| Pressure, atmospheres | 1.1 |
| Propylene oxide consumed, gms. | 37 |
| pH of product | 4.43 |

The reaction was terminated by removing the propylene oxide and moisture from the reactor.

As the reaction proceeded the product pH increased and at a pH of 4.43 the reaction product was low in sediment and haze and had the following analysis (where the "error" of analysis provides totals of about 99–101%):

| | Mole percent |
|---|---|
| Ammonium+calcium | 19 |
| Free acid | 3 |
| Ester | 77 |

EXAMPLE II (VACUUM)

Into a tumbling glass vessel fitted with lifting vanes for mixing, a gas inlet tube and thermometer, was placed 272 gms. of alginic acid having a solids content of 70% (190 grams anhydrous basis). The alginic acid containing residual calcium was previously neutralized to a total of 16 mole percent, using sodium phosphate. The pressure in the reactor was then reduced to 30 torr, by water aspiration, and the propylene oxide inlet was opened and propylene oxide from a boiler at a temperature above its boiling point was permitted to enter the reactor. The initial temperature of the reaction was 25° C. and it increased to an average temperature of 60° C. and at a pressure of 0.9 atmosphere. The reaction time was 2½ hours and the propylene oxide consumption was 171 gms. At the end of 2½ hours, the reaction was terminated by water aspiration of the propylene oxide. The product had a pH of 4.25 and on analysis was found to contain: 2 mole percent free acid; 82 mole percent ester, and 16 mole percent calcium and sodium.

EXAMPLE III (VACUUM)

Using the procedure of Example II, 272 gms. of alginic acid, containing residual calcium, at 66% solids (230 gms. on an anhydrous basis) was neutralized to a total of 16.6 mole percent using sodium phosphate and reacted with propylene oxide at an average temperature of 66° C. and pressure of 1.1 atmospheres of propylene oxide. The reaction time was 2.6 hours, and 140 gms. of propylene oxide was consumed. The product had a pH of 4.3, was 3 mole percent free acid, 80.5 mole percent ester and 16.6 mole percent calcium and sodium.

EXAMPLE IV (VACUUM)

Using the procedure of Example II, 280 gms. of alginic acid at 66% solids (184 gms. on an anhydrous basis) was preneutralized to a total of 16.7 mole percent using sodium phosphate and reacted with propylene oxide at an average temperature of 72° C. and pressure of 1.2 atmospheres. The time of the reaction was 2 hours and 146 grams of propylene oxide was consumed. The reaction was terminated as previously described and the product had a pH of 4.1, was clear and had 3.1 mole percent free acid, 80.2 mole percent ester and 16.7 mole percent of calcium and sodium.

EXAMPLE V (VACUUM)

270 gms. of alginic acid, already containing 1.7 mole percent residual calcium, at 70% solids (189 grams anhydrous basis), was preneutralized to a total of 19.6 mole percent using sodium phosphate, and placed in a tumbler reactor. The reaction was initiated as in the previous examples and the average reaction temperature was 72° C. and the reaction pressure was 1.2 atmospheres. The reaction time was 2 hours and 161 grams of propylene oxide was consumed. The product reached a pH of 4.25, produced a clear solution, and had an analysis as follows: 3.0 mole percent free acid, 77.4 mole percent ester, 17.9 mole percent sodium, and 1.7 mole percent calcium.

EXAMPLE VI (VACUUM)

Into a tumbler reactor was placed 200 gms. of 70% solids alginic acid (140 grams on an anhydrous basis) containing 4.8 mole percent residual calcium, which was preneutralized to a total of 25 mole percent using sodium phosphate. The reaction was initiated by vacuum at an initial temperature of 35° C. and the average reaction temperature was 72° C. The reaction pressure was 1.2 atmospheres and reaction time was 2 hours consuming 123 gms. of propylene oxide. The reaction was terminated by evacuating the reactor and the product had a pH of 4.35. An analysis of the product showed it to contain 3.2 mole percent free acid, 71.8 mole percent ester, 20.2 mole percent sodium and 4.8 mole percent calcium.

EXAMPLE VII (VACUUM)

Into a tumbler reactor was placed 240 gms. of 72% solids alginic acid (173 gms. on an anhydrous basis) containing 2.5 mole percent calcium and which had been preneutralized to a total of 8.5 mole percent using sodium phosphate. The reaction was initiated by vacuum and the initial temperature was 37° C. while the average temperature was 72° C. The pressure was 1.2 atmospheres and the reaction time was 2.7 hours. 160 gms. of propylene oxide was consumed during the reaction and the reaction was terminated by evacuating the reactor and the product had a pH of 3.3. On analysis of the product, there was found: 9.5 mole percent free acid; 82 mole percent ester; 6 mole percent sodium, and 2.5 mole percent calcium.

EXAMPLE VIII (VACUUM)

Into a tumbler reactor was placed 260 gms. of 70% solids, 0.6 mole percent residual calcium, alginic acid (182 gms. on an anhydrous basis) which had been preneutralized to a total of 18.5 mole percent using diammonium phosphate. After vacuum initiation, the initial temperature was 32° C. and the average reaction temperature was 66° C. The reaction pressure was 1.1 atmospheres and the reaction time was 2 hours during which 177 grams of propylene oxide was consumed. The product pH after termination was 3.95 and the product was clear and had an analysis as follows: 7.5 mole percent free acid; 73.4 mole percent ester; 18.5 mole percent ammonium ion, and 0.6 mole percent calcium.

EXAMPLE IX (VACUUM)

260 gms. of alginic acid (70% solids) which is 182 gms. on an anhydrous basis and contained 1.5 mole percent residual calcium was preneutralized to a total of 14.8 mole percent using diammonium phosphate and placed into a tumbler reactor. After vacuum initiation, the initial temperature was 32° C. and the reaction reached 68° C. Using a pressure of 1.2 atmospheres, the reaction time was 3 hours and 177 gms. of propylene oxide was consumed. After termination by evacuating the reaction, the product had a pH of 4.5 and an analysis as follows: 2.67 mole percent free acid; 82.5 mole percent ester; 13.3 mole percent ammonium ion, and 1.5 mole percent calcium.

EXAMPLE X (VACUUM)

260 gms. of alginic acid (70% solids) which is 182 gms. on an anhydrous basis and contained 2.5 mole percent residual calcium was neutralized to a total of 14 mole percent using sodium phosphate. This preneutralized alginic acid was placed into a tumber reactor and after vacuum initiation the initial reaction temperature was 40° C., and the average reaction temperature was 67° C. The pressure was 1.1 atmospheres, the reaction time was 2 hours and 157 gms. of propylene oxide was consumed. The product had a pH of 4.35 and had an analysis as follows: 1.8 mole percent free acid; 85.7 mole percent ester; 10 mole percent sodium, and 2.5 mole percent calcium.

EXAMPLE XI (VACUUM)

240 gms. of 68% solids alginic acid (163 gms. on an anhydrous basis), 2.1 mole percent residual calcium, was placed into a tumbler reactor. The alginic acid had been preneutralized to a total of 9 mole percent using sodium acetate. After vacuum initiation, the alginic acid was reacted with propylene oxide. The initial temperature was 34° C. and the average reaction temperature was 72° C. The reaction pressure was 1 atmosphere and the reaction proceeded for 2 hours. The reaction was then terminated by evacuating the reactor and the product had the following characteristics: 3.5 pH; 9.7 mole percent free acid; 81.3 mole percent ester; 6.9 mole percent sodium, and 2.1 mole percent calcium.

EXAMPLE XII (SWEEP)

260 gms. of alginic acid (70% solids) which is 182 gms. on an anhydrous basis, and contained 2.0 mole percent residual calcium, was preneutralized to a total of 15.1 mole percent using sodium phosphate. The material was then placed into a tumbler reactor that was fitted with lifters for mixing, a gas inlet tube, and a thermometer. The temperature of the reaction mixture was taken to 40° C. while the tumbler reactor was tumbling in a water bath. Propylene oxide in a container adjacent to the tumbler reactor was heated above its boiling point to a pressure of 1.3 atmospheres and the gas inlet tube to the reactor was then opened and a large amount of propylene oxide vapor was swept through the reaction chamber expelling the air that previously filled the container. The reaction proceeded rapidly and reached a temperature of 68° C. The reaction pressure was one atmosphere and the reaction time was 2.5 hours. 136 gms. of propylene oxide was consumed in the reaction and the reaction was terminated by removing the gas inlet tube and evacuating the chamber using a water aspirator, bringing the pressure down to 30 torr. The product was removed; its pH was 4.2. Its solution was clear. The product had an analysis as follows: 2 mole percent free acid; 81.6 mole percent ester; 13.1 mole percent sodium, and 2.0 mole percent calcium.

EXAMPLE XIII (SWEEP)

Into a tumbler reactor was placed 400 gms. of 69% solids alginic acid (276 mgs. on an anhydrous basis) which contained 1.2 mole percent calcium and had been preneutralized to a total of 10.3 mole percent using sodium bicarbonate. The reaction was run in the manner described in Example XII using a sweep of propylene oxide. The initial temperature was 40° C. and the average temperature was 72° C. The reaction pressure was 1 atmosphere and the reaction time was 2 hours. 276 gms. of propylene oxide was consumed and the reaction was terminated as in Example XII. The product had a pH of 4.2, was clear, and had the following analysis: 2.7 mole percent free acid; 87 mole percent ester; 9.1 mole percent sodium, and 1.2 mole percent calcium.

EXAMPLE XIV (SWEEP)

300 gms. of 72% solids alginic acid (216 gms. on an anhydrous basis and contained 1 mole percent residual calcium) was preneutralized to a total of 17.2 mole percent using sodium phosphate. This material was placed into a tumbler reactor and reacted in the manner described in Example XII. The initial temperature was 45° C., the average temperature was 73° C., the pressure developed was 1.0 atmosphere, and 220 gms. of propylene oxide was consumed during the 2 hours that the reaction ran. The reaction was then terminated and the product had a pH of 4.5 with the following analysis: 2.1 mole percent free acid; 80.7 mole percent ester; 16.2 mole percent sodium, and 1 mole percent calcium.

EXAMPLE XV (SWEEP)

300 gms. of 69% solids alginic acid (270 gms. on an anhydrous basis and contained 1 mole percent calcium) was preneutralized to a total of 10.9 mole percent using sodium bicarbonate. This material was placed into a tumbler reactor with a propylene oxide sweep as described in Example XII. The initial temperature was 42° C. and the average temperature was 73° C. The pressure developed was one atmosphere and 214 gms. of propylene oxide was consumed during the 2 hour reaction. The reaction was teminated by evacuating the reactor and the product was found to have a pH of 3.8 with an analysis as follows: 4.6 mole percent free acid; 84.5 mole percent ester; 9.9 mole percent sodium; and 1 mole percent calcium.

EXAMPLE XVI (SWEEP)

80 gms. of alginic acid (76% solids) which is 60.8 grams on an anhydrous basis and that contained 1.6 mole percent residual calcium was preneutralized to a total of 8.5 mole percent using sodium hydroxide and was placed into a tumbler reactor. Using the general reaction procedure described in Example XII, the initial temperature was 50° C., the average temperature was 96° C., and the average pressure was 1 atmosphere. The reaction time was 2.5 hours and 251 gms. of propylene oxide was introduced. (Most of this material was passed through the secondary trap of the reactor and did not enter the reaction.) The reaction was terminated in the general manner of Example XII, and the product had a pH of 4.4. The product was clear and had the following analysis: 4.4 mole percent acid; 87.1 mole percent ester; 6.9 mole percent sodium salt, and 1.6 mole percent calcium.

EXAMPLE XVII (SWEEP)

137 gms. of 70% solids alginic acid (95.9 grams on an anhydrous basis and containing 7.9 mole percent calcium) was placed into a tumbler reactor. The alginic acid had been preneutralized to a total of 12.6% using sodium carbonate. The reaction was conducted according to the procedure described in Example XII. The initial temperature was 60° C., the average reaction temperature was 73° C., and the pressure reached was 1 atmosphere. After a reaction time of 1.7 hours, the reaction was terminated by evacuating the reactor. The product pH was 3.9; it was clear and had an analysis as follows: 4.7 mole percent free acid; 83.7 mole percent ester; 4.7 mole percent sodium, and 7.9 mole percent calcium.

The pH value for the propylene glycol alginate products, set forth in the foregoing Examples I–XVII were all determined at a concentration of 2% by weight in distilled water.

To reemphasize, all total preneutralization levels include the contribution of the residual calcium ions not washed from the original calcium alginate by hydrochloric acid.

COMPARISON EXAMPLE XVIIIA (VACUUM)

Into a tumber reactor was placed 280 gms. of 70% solids alginic acid which contained residual calcium and was further neutralized with trisodium phosphate to a total of approximately 18 mole percent. The reaction was vacuum initiated at 35° C. and the reaction was run for 5½ hours at 66° C. and consumed 170 gms. of propylene oxide. The pH of the product at the termination of the reaction had reached 6.5, an over reaction as the product was insoluble. (Note that under about the same conditions except a time of 2.6 hours, Example III gave a product of pH=4.3).

COMPARISON EXAMPLE XVIIIB

As a comparison to this vacuum initiated reaction XVIIIA, another test was carried out using the same equipment and alginic acid. The alginic acid was brought to 35° C. and then without excluding air from the vessel, 180 ml. of propylene oxide was placed into the vessel, via a syringe. The reactor was immediately sealed and the temperature was kept at 66° C. for 5½ hours. The product here had a pH of 3.2 which is underreacted. (Note that Example III gave a very suitable pH product in 2.6 hours time.)

Thus the sweep initiated process and the vacuum initiated process proceed at a more rapid rate than a reaction which is run into the presence of the air contained in the reactor before introducing the propylene oxide.

COMMENT ON EXAMPLES I–XI AND XVIIIA

Examples VII and XI run at 8.5 and 9.0% metal ion content show that temperatures and/or times must be markedly increased in order to produce product of better than borderline pH at partial neutralizations approaching the lower limit of this process. Taking into account the error of reproducibility in running experiments on this small scale, Examples VIII and IX show the favorable effect on product pH by increasing the metal ion content to 14–15%. Examples I–VI show the very favorable effect on shortening time and permitting use of the lower temperatures when the neutralization is raised to the region of 16–25%.

Example XVIIIA deliberately run at a time approaching the lower range of the prior art processes is inoperable in the sense that the product is of no commercial interest because of the lack of water solubility and the very high pH of 6.5.

COMMENT ON EXAMPLES XII–XVII

The sweep examples in general fall in line with the vacuum initiated examples; however, there seems to be a bit better performance at the lower percent neutralization and the degree of neutralization is not as important on the product pH, other things being about equal, as in the vacuum examples. Example XVI demonstrates that at the lower range of neutralization called for in the defined process, an elevated temperature gives a product of suitable pH in a very reasonable time.

The working examples have demonstrated the ability of the process to produce propylene glycol alginate of suitable quality. More particularly, the examples demonstrate that coordination of the "alginic acid" reactant and the specified reaction conditions, especially exclusion of air from the reaction vessel, permits production of propylene glycol alginate having a defined pH with the preferred 3.8–4.6 range in not more than about 3 hours reaction time.

Thus having described the invention, what is claimed is :

1. A process for the preparation of propylene glycol alginate which process comprises:
    (1) reacting an alginic acid which is (a) neutralized to the extent of from about 6 mole percent to about 50 mole percent; and (b) has a solids content of from about 65 to about 78 weight percent;
    (2) and gaseous propylene oxide;
    (3) said propylene oxide affording essentially the gaseous atmosphere in said reaction zone;
    (4) at a temperature from about 60° C. to about 100° C.;
    (5) at a pressure of at least about 0.8 atmosphere;
    (6) for a time such that the propylene glycol alginate produced has solubility in distilled water of at least about 0.1 weight percent.

2. The process of claim 1 wherein said propylene oxide is swept through said alginic acid in order to remove inert gas prior to said reaction.

3. The process of claim 1 wherein said alginic acid is vacuum processed to remove inert gas prior to contract with said propylene oxide.

4. The process of claim 1 wherein said alginic acid is partially neutralized by an ion from the class consisting of alkali metals, alkaline earth metals, ammonium, lower alkylamines and mixtures thereof.

5. The process of claim 4 wherein said propylene glycol alginate produced has a pH, 2 weight percent solution of said alginate in distilled water, of from about 3.4 to about 4.9.

6. The process of claim 1 wherein said pressure is about 0.8–1.5 atmosphere.

7. The process of claim 6 wherein about 8 mole percent to about 22 mole percent of the carboxyl groups of said alginic acid are neutralized.

8. The process of claim 1 wherein said alginic acid reactant and acid reaction conditions are coordinated to produce a propylene glycol alginate product having a pH, 2 weight percent solution of said alginate in distilled water, of about 3.8–4.6, in a reaction time of not more than about 3 hours.

9. A process for the preparation of propylene glycol alginate which process comprises:

reacting an alginic acid which is (i) neutralized to the extent of 1.7 mole percent calcium and 17.9 mole percent sodium and has (ii) a solids content of 70 weight percent and gaseous propylene oxide, in the substantial absence of air, at an average temperature of 72° C. at a reaction pressure of 1.2 atmospheres for a time of 2 hours to obtain a propylene glycol product having a pH, 2 weight percent solution in distilled water, of 4.25, where the reaction vessel containing said alginic acid is evacuated to remove air therefrom prior to the introduction of said propylene oxide.

10. A process for the preparation of propylene glycol alginate which process comprises:

reacting an alginic acid which is (i) neutralized to the extent of 1.0 mole percent calcium and 16.2 mole percent sodium and has (ii) a solids content of 72 weight percent and gaseous propylene oxide, in the substantial absence of air, at an average temperature of 73° C., at a reaction pressure of 1.0 atmosphere for a time of 2 hours to obtain a propylene glycol alginate product having a pH, 2 weight percent solution in distilled water, of 4.5, where the reaction vessel containing said alginic acid is freed from air by a sweep of propylene oxide prior to the start of said reaction.

References Cited

UNITED STATES PATENTS

| 1,814,981 | 7/1931 | Thornley et al. | 260—209.6 |
| 2,426,125 | 8/1947 | Steiner | 260—209.6 |
| 2,494,911 | 1/1950 | Steiner et al. | 260—209.6 |

DONALD E. CZAJA, Primary Examiner

R. W. GRIFFIN, Assistant Examiner